United States Patent [19]

Fleming et al.

[11] Patent Number: 5,326,677
[45] Date of Patent: Jul. 5, 1994

[54] OPTICAL RETRIEVAL APPARATUS USING A TELLURIUM (IV) LEUCO DYE

[75] Inventors: James C. Fleming, Webster; Michael R. Detty, Rochester, both of N.Y.

[73] Assignee: Eastman Kodak Company, Rochester, N.Y.

[21] Appl. No.: 19,943

[22] Filed: Feb. 19, 1993

[51] Int. Cl.⁵ .............................. G11B 7/24
[52] U.S. Cl. ........................ 430/347; 430/21;
430/338; 430/341; 430/495; 430/945; 503/201;
503/218; 250/271; 369/100; 369/288
[58] Field of Search ............... 430/347, 495, 945, 332,
430/338, 343, 21, 341; 369/100, 288; 250/271;
503/201, 218

[56] References Cited

U.S. PATENT DOCUMENTS

| | | | |
|---|---|---|---|
| 4,529,684 | 7/1985 | Sasagawa et al. | 430/269 |
| 4,584,258 | 4/1986 | Detty et al. | 430/270 |
| 4,933,221 | 6/1990 | Nishimura et al. | 428/64 |
| 4,940,618 | 7/1990 | Hamada et al. | 428/64 |
| 4,985,345 | 1/1991 | Hayakawa et al. | 430/335 |
| 5,234,797 | 8/1993 | Satake et al. | 430/338 |

FOREIGN PATENT DOCUMENTS

| | | |
|---|---|---|
| 2005520 | 6/1990 | Canada . |
| 0177108 | 2/1985 | European Pat. Off. . |
| 0353393 | 4/1989 | European Pat. Off. . |
| 63-004990 | 1/1988 | Japan . |
| 4-094966 | 3/1992 | Japan . |

OTHER PUBLICATIONS

James C. Fleming, Optical Recording in Organic Media: Thickness Effect, Journal of Imaging Science, vol. 33, No. 3, May/Jun. 1989.
Alan B. Marchant, Optical Recording, 1990, pp. 23–40.
Masaru Matsuoka, Infrared Absorbing Dyes, 1990, pp. 19–33.

Primary Examiner—Charles L. Bowers, Jr.
Assistant Examiner—John A. McPherson
Attorney, Agent, or Firm—Raymond L. Owens

[57] ABSTRACT

There is disclosed an optical retrieval apparatus which uses a laser for illuminating an optical element. A sensor responds to modulated light from the optical element to produce electrical signals. The optical element has a substrate and on the surface of the substrate, a dye containing recording layer and a light reflecting layer. The improvement is that the dye is a leuco dye.

1 Claim, 2 Drawing Sheets

5,326,677

OPTICAL RETRIEVAL APPARATUS USING A TELLURIUM (IV) LEUCO DYE

CROSS-REFERENCE TO RELATED APPLICATIONS

Reference is made to commonly assigned U.S. Pat. application No. 08/019,935 filed Feb. 19, 1993 to Fleming et al, entitled "RECORDABLE OPTICAL ELEMENT HAVING A LEUCO DYE" and U.S. Pat. application No. 08/019,522 filed Feb. 19, 1993 to Fleming et al, entitled "RECORDABLE OPTICAL ELEMENT HAVING A LEUCO DYE".

FIELD OF THE INVENTION

The present invention relates to optical retrieval apparatus that are optical recording elements.

BACKGROUND OF THE INVENTION

One of the currently popular forms of optical retrieval apparatus uses an optical recordable element in the compact disc or CD. Digital information is stored in the form of low reflectivity marks or pits on an otherwise reflective background. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the reflectivity is lower than in those areas not having the deformations.

It is desirable to produce optical recording elements which, when recorded in real time, produces a record that mimics the conventional CD on read out. In this manner, information can be added to the CD and the CD can be used on a conventional CD player.

One recently disclosed optical retrieval apparatus of this type is the so called photo"Photo CD". In this system, conventional photographic film is first processed in a conventional manner. Then, the images from the film are digitized and the digital information is recorded in a CD readable form on an optical recording material. Images can then be played back on a conventional CD type player into a conventional television. Since a CD has a capacity for a number of digitized images that is greater than the typical roll of consumer film, it is anticipated that the user will want to add images and information to a partially recorded CD. Thus there exists the need for recordable, CD compatible optical recording material.

One method for forming a recordable element that mimics conventional mold pressed CD elements is to provide a transparent heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Materials of this type are described in U.S. Pat. No. 4,940,618, European Patent Application 0353393 and Canadian Patent 2,005,520. There are a number of problems with using a deformable support including the cost of producing the optical element.

SUMMARY OF THE INVENTION

It is an object of this invention to provide an optical retrieval apparatus which uses a different optical recording element.

This object is achieved by an optical retrieval apparatus comprising:

(a) an optical element having a substrate and on the surface of the substrate, a dye containing recording layer which has information dye marks recorded thereon and a light reflecting layer, the dye marks being formed by a leuco dye which has been thermally reacted upon to become a near-infrared absorption dye;

(b) means including a laser for producing a beam which illuminates the optical element and which is reflected from the reflecting layer so as to be modulated by the marks; and (c) sensor means responsive to the reflected modulating radiation beam to produce electrical signals having an information content corresponding to the dye marks.

DETAILED DESCRIPTION OF THE INVENTION

Figure 1:
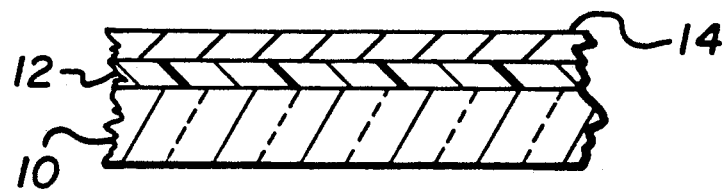
FIG. 1 is a schematic representation, in cross-section, of one element which can be used in the optical retrieval apparatus of FIG. 3.
Figure 2:
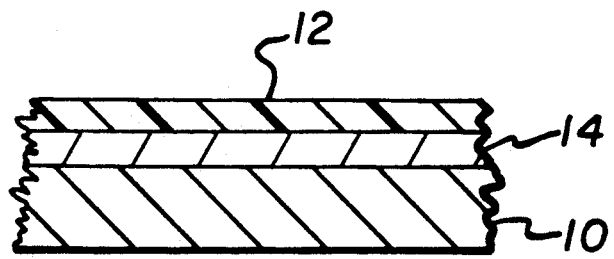
FIG. 2 is a schematic representation, in cross-section, of another element in accordance with the invention.

Optical elements according to this invention as shown in FIGS. 1 and 2 include at least three layers. The substrate 10 has thereon, an optical recording layer 12, and a reflective layer 14. Protective layers may also be used but will not be discussed since they are not necessary for the practice of this invention. See James C. Fleming, "Optical Recording in Organic Media: Thickness Effects", Journal of Imaging Science, Vol. 33, No. 3, May/June 1989, Pages 65–68.

In FIG. 1 the substrate is transparent and light which illuminates the recording layer 12 passes through the substrate 10. In FIG. 2, the substrate is opaque or transparent and light directly illuminates the recording layer.

Recording is accomplished by dye marking in the recording layer 12 with a write laser focused on the recording layer 12, either through the substrate (FIG. 1) or directly (FIG. 2). A second dye is formed in the recording layer in response to light absorbed by the sensitizing dye. The second dye is absorptive toward the light of the read laser. The record thus consists of dark marks of relatively low reflectivity on a background of relatively high reflectivity in relation to the read laser light.

The preferred embodiment of the invention is that of a writable compact disc (CD) as shown in FIG. 1. The write and read lasers are of the laser diode type and operate in the infrared region between 770 and 830 nm. The write laser power is selected to cause a chemical reaction of the leuco dye to produce a dye forming a dark spot whereas the power of the read laser will not cause such a chemical reaction. For a more complete explanation of optical recording and playback processes as well as the construction of compact discs, see *Optical Recording*, Alan B. Marchant, Pages 23–40, Addison-Wesley Publishing Company, Reading, Mass. (1990).

The following is a more detailed discussion of the optical element.

Recording Apparatus

Figure 3:
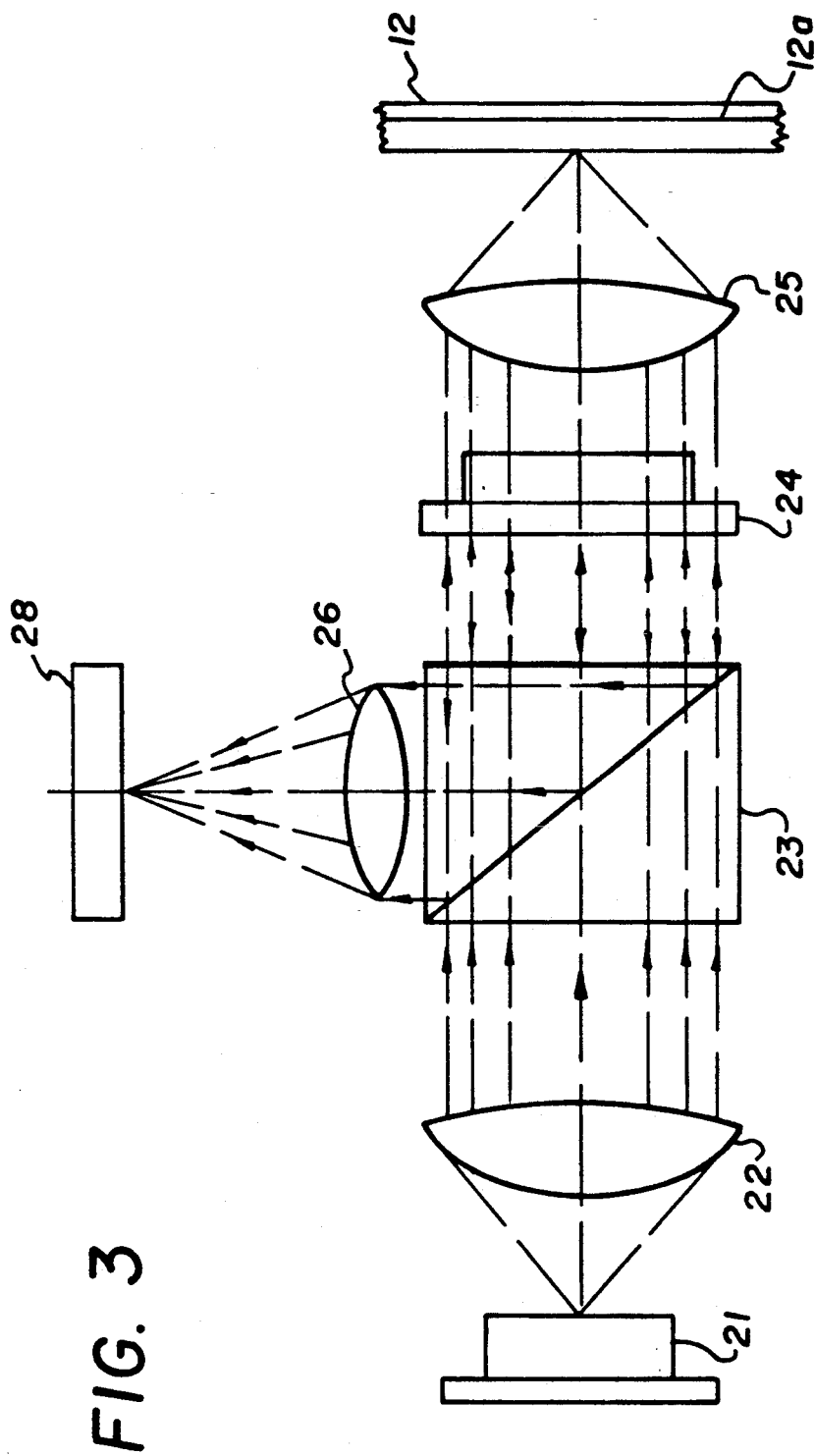
FIG. 3 is a top view of a block diagram of an optical retrieval apparatus which uses the element of FIGS. 1 and 2.

Referring to FIG. 3, an optical retrieval apparatus which uses the elements of FIGS. 1 and 2 on which information has been recorded is shown. A laser radiation source 21, typically a laser diode, provides a radiation beam which is collimated by collimating lens 22. The collimated radiation beam is transmitted through a polarization beam splitter 23 and applied to a quarter wave plate 24. The polarization beam splitter 23 provides linear polarization for the radiation beam and the quarter wave plate 24 provides a circular polarization to the radiation beam. Light is focused by objective lens 25 on the information storage surface 12a of the recording layer 12. The interaction with the surface 12a causes the radiation beach to be reflected and diffracted therefrom. The resulting radiation beam is colliated by objective lens 25 and the collimated resulting radiation beam is transmitted through the quarter wave plate 24. The quarter wave plate restores the linear colarization of the radiation beam. However, a component of the restored polarized radiation beam perpendicular to the polarization of the originally polarized beam will typically be present as a result of the second passage through the quarter wave plate 24. When the restored, polarized radiation beam is applied to the polarization beam splitter 23, the perpendicular component will be reflected by the beam splitter 23. The reflected radiation beam is applied to a sensor focusing lens 26 which converges the resulting radiation beam on sensor array 28. The resulting radiation beam has imposed thereon modulation from the dye marking in the element that can be processed to provide the information (or data) which is stored in the optical recording element. In addition, the resulting radiation beam can be processed in such a manner as to provide tracking and focusing signals which controls the position of the focused radiation beam on the storage surface 12a (i.e., the tracking in one dimension) and which controls the distance of the objective lens 25 from the storage surface 12a, (i.e., the focusing of the radiation beam on the storage surface. See for example published European Patent Application 0,177,108 A1, issued in the name of A. Smid, P. F. Grave, and H. 't Lam, entitled "Opto-Electronic Focussing-Error Detection System, and filed on Feb. 10, 1985. In this retrieval apparatus, the quarter wave plate imparts, to the radiation beam illuminating the storage surface 12a, a circular polarization. After reflection from the storage surface, the quarter wave plate restores a linear polarization. However, the linearly polarized radiation beam will have a component which is rotated by an angle of 90° from the plane of polarization originally established by the polarization beam splitter 23. The rotated component of the radiation resulting from interaction with the storage surface 12a is reflected by the beam splitter 23 and applied to sensor array 28. The sensor array 28 produces usable electrical signals having information content corresponding to the information dye marks.

The support

For FIG. 1, supports can be made from optically transparent resins with or without surface treatment. For FIG. 2, the substrate may be opaque relative to write/read laser light. The preferred resins for the FIG. 1 embodiment are polycarbonates and polyacrylates. The support may include a guide groove for laser tracking.

Recording layer

The recording layer includes a leuco dye dye, a sensitizing dye and a binder. In addition, useful addenda for the recording layer, may include stabilizers, surfactants, binders and diluents.

Solvent Coatings

Coating solvents for the recording layer are selected to minimize their effect on the support. Useful solvents include alcohols, ethers, hydrocarbons, hydrocarbon halides, cellosolves, ketones and water. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellusolve, ethyl cellusolve, 1-methoxy-2-propanol, methyl ethyl ketone, 4-hydroxy-4-methyl-2-pentanone, hexane, cyclohexane, ethylcyclohexane, octane, benzene, toluene, and xylene. Other less desirable solvents include dimethylsulfoxide and dimethyl formamide. Preferred solvents are hydrocarbon solvents and alcohol solvents since they have the least effect on the preferred polycarbonate substrate.

The Reflective Layer

The reflective layer can be any of the metals conventionally used for optical recording materials. Useful metals can be vacuum evaporated or sputtered and include gold, silver, aluminum, copper, and alloys thereof. Gold is the preferred reflective layer material.

Binders

The binders are selected to be substantially nonabsorbtive toward the wavelengths of the write and read diode laser light. Examples of binder materials are set forth in subsequent examples.

Sensitizing Dye

A sensitizing dye is any dye that absorbs at a desired wavelength such as 780 nm. Preferable dyes are those which absorb strongly such that, at a concentration of $\leq 5\%$ of the recording layer in the control formulation below, the collimated beam reflectance as measured through the substrate at 780 nm after gold coating in between 50% and 90%.

Leuco dye

A leuco dye will for the purpose of this disclosure be defined as an organic reagent which absorbs at wavelengths which are shorter than when it is converted to a dye. Such a dye will absorb substantially at longer wavelengths upon thermochemical or photochemical reaction. These chemical reactions include thermally or photochemically induced changes such as oxidation, reduction, protonation, deprotonation, ring opening, metallization, condensation, dehalogenation, dehydrohalogenation, dehydration, rearrangement, polymerization, etc.

Procedure for the Identification of a Leuco dye Useful in an Optical Recording Element A leuco dye may be identified as being useful in an optical recording element by coating the material in an optical disc format along with a sensitizing dye and a binder, writing on the element with a focussed laser, and examining the recorded disc for evidence of dye formation.

Test Formulation and Coating

A solution of the materials to be coated can be prepared at 3% solids in a suitable solvent such as methoxypropanol, as defined in Table I. The test leuco dye is present at 40% of the solids. A control formulation is similarly prepared where the test leuco dye is replaced with an equal weight of binder.

TABLE I

| Melt Composition | | Test | Control |
|---|---|---|---|
| Component | Example | formulation | Formulation |
| Leuco dye | Test dye | 120 mg | 0 mg |
| Sensitizing dye | I (See Example I) | 15 mg | 15 mg |
| Binder | II (See Example I) | 165 mg | 285 mg |
| Solvent | 1-methoxy-2-propanol | 10 ml | 10 ml |

The solutions are spin coated onto a featureless polycarbonate substrate of compact disc dimensions to a dry thickness of approximately 200 nm (e.g. flood speed of 300 rpm, dwell time/speed of 8.4 sec/500 rpm, ramp speed/time 500-2000 rpm/20 sec). The disc is completed for testing by the sputtering or thermal evaporation of 100 nm or more of a gold reflector layer onto the dye layer. A protective lacquer layer may also be present.

In the test formulation the total amount of sensitizing dye and binder can be conveniently set at 60% of the solids. The amount of the sensitizing dye is selected so that the collimated beam reflectivity as measured through the substrate at 780 nm after gold coating is from 50 to 90%. In the case of dye I (Table I) the sensitizing dye is present at 5% of the solids and affords a reflectivity of 71%.

Disc Testing and Evaluation

The disc is recorded on by a focussed laser operating at near 780 nm. A power series from 4 to 16 mW of 3.56 μm marks and spaces is written to the disc at a spinning velocity of 2.8 m/s. A maximum CNR in the test disc which is greater than in the control disc maximum is suggestive of a useful dye. Confirmation of the utility of the leuco dye is made by evaluation of the electronic wave forms associated with the recorded tracks and/or examination of the tracks microscopically. Wave form analysis must indicate that the recorded signal derives from marks whose reflectivity is reduced through the length of the mark. That is, dye formation occurred rather than dye bleach, which would cause an increase in reflectivity. The control disc must show no persistent reduction in reflectivity through the length of the mark when examined by either the electronic or microscopic technique.

One class of leuco dye that can be used in accordance with this invention is a tellurapyranyl Te(IV) leuco dye that has the following structure:

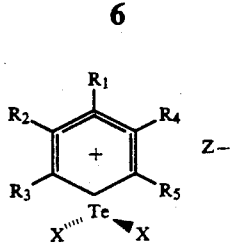

wherein:

$R_1$, $R_3$, and $R_5$ each independently represent hydrogen, alkyl, aryl, $(CR_6=CH)_n CR_7$-A1 or $(CH=CH)_m$A2 provided that one, and only one of $R_1$, $R_3$, and $R_5$ is $(CR_6=CH)_n CR_7$=A1 or $(CH=CH)_m$A2; $R_2$ and $R_4$ each independently represents hydrogen, alkyl, or halogen;

$R_2$ and $R_3$, or $R_4$ and $R_5$, taken together with all the carbon atoms to which they are attached from a mononuclear or polynuclear fused carbocyclic ring having form about 5 to 20 carbon atoms;

$R_6$ and $R_7$ are each independently hydrogen, cyano, akyl or aryl;

A1 represents a monocyclic or polycyclic heterocyclylidene Group such as, but not limited to, oxazolylidene, thiazolylidene, selenazolylidene, imidazolylidene, pyranylidene, thiapyranylidene, selenapyranylidene, tellurapyranylidene, oxoindolazinylidene, benzoxazolylidene, benzothiazolylidene, benzoselenazolylidene, benzopyranylidene, benzothiapyranylidene, benzoselenapyranylidene, or benzotellurapyranylidene;

A2 represents aryl, amino, diakylaminoaryl, alkylamino, arylamino, dialkylaxnino, diarylcunino, or a monocyclic or polycyclic heterocyclyl group such as, but not limited to, oxazolyl, tetrahydroquinolinyl, 9-jololidyl, thiazolyl, selenazolyl, imidazolyl, benzoxazolyl, benzothiazolyl, or naphthyl;

n represents a number from 0 to 5;

m represents a number from 0 to 5;

X represents a functional group such as, but not limited to, Br, Cl , F, I, CH3CO2; and Z represents an anion such as, but not limited to, BF4, ClO4, CF3SO3, FSO3, PF6, Cl, Br, or I.

A preferred tellurapyranyl Te(IV) material is benzotellurapyranyl Te(IV) materials wherein either $R_2$ and $R_3$, or $R_4$ and $R_5$, taken together with the carbon atoms to which they are attached, form a fused carbocyclic ring having six carbon atoms. They have the structure:

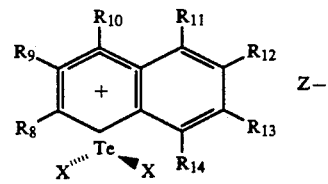

wherein:

$R_{10}$ and $R_8$ each independently represents hydrogen, alkyl, aryl, $(CR_6=CH)_n CR_7$-A1 or $(CH=CH)_m$A2 provided that one, and only one of $R_8$ and $R_{10}$ is $(CR_6=CH)_n CR_7$=A1 or $(CH=CH)_m$A2;

$A_1$, $A_2$, $R_6$, $R_7$, n, m, and X are as previously defined;

$R_9$ represents hydrogen or alkyl;

$R_{11}$, $R_{12}$, $R_{13}$, and $R_{14}$ each independently represent hydrogen, alkyl, halogen, hydroxy, or alkoxy.

"Alkyl" includes a branched- or straight-chain hydrocarbon having up to 20 carbon atoms, such as methyl, butyl, dodecyl, tertiary-butyl, and isobutyl as well as substituted alkyl groups such as hydroxyethyl, hydroxypropyl, and the like; "aryl" includes phenyl, naphthyl, anthryl, and the like substituted aryl such alkoxyphenyl and dialkylaminophenyl and the like.

Upon thermal treatment via the write laser and the sensitizing dye, the tellurapyranyl Te(IV) dyes undergo reductive elimination of $X_2$ to give tellurapyrylium dyes having one of the following structures with all groups defined above.

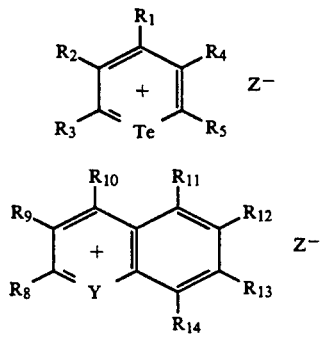

General Procedure for the Preparation of Te(IV) Dichorides

A stock solution of chlorine in carbon tetrachloride was prepared by bubbling chlorine gas into the solvent. The weight of chlorine added was used to compute molarity (approximately 0.5M). The chlorine solution (1.5 equivalents) was added via syringe to the tellurapyrylium dye in dichloromethane (approximately 0.3M). The resulting solution was stirred 15 min at ambient temperature and was then diluted with an equal volume of ether. The Te(IV) dichloride precipitated, was collected by filtration, washed with ether and dried.

LD2

89% of a red solid, mp 185°-188° C. (dec) (See ref. 5); $\lambda_{max}$ (CH$_2$Cl$_2$) 548 nm ($\epsilon$55,000 L mol$^{-1}$s$^{-1}$); IR (KBr) 2960, 1550 (s), 1470, 1365, 1313, 835 (s) cm$^{-1}$.

LD4

80% Of an orange-gold solid, mp 178°-181° C.(dec); $\lambda_{max}$ (CH$_2$Cl$_2$) 532 nmn ($\epsilon$60,000 L mol$^{-1}$s$^{-1}$); $^1$H NMR (CD$_3$CN) $\delta$ 8.59 (d x d, 1 H,J=12, 15 Hz), 8.46 (s, 2 H), 7.16 (d, 1 H, J=15 Hz), 7.025 (s, 1 H), 6.97 (d, 1 H, J=12 Hz), 6.49 (s, 1 H) , 1.61 (s, 18 H) , 1.58 (s, 9 H) , 1.50 (s, 9 H); IR (KBr) 2960, 1555, 1475, 1365, 963, 838 cm$^{-1}$.

LD6

89% of an orange-gold crystalline solid, mp 198°-202° C.(dec); $\lambda_{max}$ (CH$_2$Cl$_2$) 535 nm ($\epsilon$59,000 L mol$^{-1}$s$^{-1}$); $^1$H NMR (CD$_3$CN) $\delta$ 8.64 (d x d, 1 H, J=12, 15 Hz), 8.49 (s, 2 H), 7.18 (d, 1 H, J=15 Hz), 7.05 (s, 1 H), 6.98 (d, 1 H,J=12 Hz), 6.50 (s, 1 H), 1.61 (s, 18 H), 1.58 (s, 9 H); IR (KBr) 2960, 1554, 470, 1365, 1315, 1280, 1225, 1200cm<$^1$. Anal. Calcd for C$_{29}$H$_{43}$Cl$_2$SeTe.Cl: C, 49.44; H, 6.15. Found: C, 9.44; H, 5.73.

LD10

89% yield of a maroon solid, mp 177°-180° C.(dec); $\lambda_{max}$ (CH$_2$Cl$_2$) 548 nm ($\epsilon$56,000 L mol$^{-1}$s$^{-1}$). Anal. Calcd for C$_{29}$H$_{43}$Cl$_2$Te$_2$.Cl: C, 46.24; H, 5.75. Found: C, 45.80; H, 5.46.

LD11

90% of a jet-black solid, mp 171°-175° C.(dec); $\lambda_{max}$ (CH$_2$Cl$_2$) 530 nm ($\epsilon$48,000 L mol$^{-1}$s$^{-1}$); $^1$H NMR (CD$_3$CN) $\delta$ 8.34 (d, 1 H, J=13.7 Hz), 8.14 (br s, 1 H), 7.75 (br s, 1 H), 7.58 (d, 1 H, J=13.7 Hz), 721 (br d, 2 H), 7.03 (s, 1 H), 6.66 (s, 1 H), 3.61 (s, 6 H), 1.57 (s, 9 H), 1.52 (s, 9 H). Anal. Calcd for C$_{23}$H$_{32}$Cl$_2$NTe.PF$_6$.C, 41.48; H, 4.84; N, 2.10. Found: C, 40.87; H, 4.78; N, 2.12.

LD12

54% of a brick-red solid, mp 203°-206° C. (dec); $\lambda_{max}$ (CH$_2$Cl$_2$) 535 nm ($\epsilon$59,000 L mol$^{-1}$s$^{-1}$); $^1$H NMR (CD$_3$CN) $\delta$ 8 8.13 (d, 1 H,J=13.7 Hz), 7.93 (s, 1 H), 7.60 d, 1 H, J=13.7 Hz), 7.59 (s, 1 H), 7.01 (s, 1 H), 6.68 (s, 1 H), 3.91 (br t, 4 H, J=5.5 Hz), 1.88 (br t, 4 H, J=5.5 Hz), 1.57 (s, 9 H), 1.52 (s, 9 H), 1.36 (s, 6 H), 1.32 (s, 6 H). Anal. Calcd for C$_{31}$H$_{44}$Cl$_2$NTe.PF$_6$: C, 48.10; H, 5.73; N, 1.81. Found: C, 47.85; H, 5.54; N, 1.76

General Procedure for the Preparation of Te(IV) Dibromides

A stock solution of bromine in carbon tetrachloride was prepared (approximately 0.5M). The bromine solution (1.5 equivalents) was added via syringe to the tellurapyrylium dye in dichloromethane (approximately 0.3M). The resulting solution was stirred 15 min at ambient temperature and was then diluted with an equal volume of ether. The Te(IV) dibromide precipitated, was collected by filtration, washed with ether, and dried.

LD1

92% of an orange solid, mp 264°-268° C.(dec); $\lambda_{max}$ (CH$_2$Cl$_2$) 522 nm ($\epsilon$59,000 L mol$^{-1}$s$^{-1}$); IR (KBr) 2960, 1590 (sh), 1560, 1365, 1313, 1280, 840 cm$^{-1}$. Anal. Calcd for C$_{29}$H$_{43}$Br$_2$STe.PF$_6$: C, 40.69; H, 5.06. Found: C, 39,95; H, 4.84.

LD5

79% of an orange solid, mp 195°-200° C.(dec);$\lambda_{max}$ (CH$_2$Cl$_2$) 544 nm ($\epsilon$62,000 L mol$^{-1}$s$^{-1}$); 1H NMR (CD3CN) $\delta$ 8.59 (d x d, 1 H,J=12, 15 Hz), 8.46 (s, 2 H), 7,155 (d, 1 H,J=15 Hz), 7.02 (s, 1 H), 6.95 (d, 1 H, J=12 Hz), 6.51 (s, 1 H), 1.61 (s, 27 H), 1.53 (s, 9 H); IR (KBr) 2960, 1590, 1552 (s), 1470, 1363, 1312, 1274, 838 cm$^{-1}$.

LD13

96% of a brick-red solid, mp 185°-189° C.(dec);$\lambda_{max}$ (CH$_2$Cl$_2$) 535 nm ($\epsilon$59,000 L mol$^{-1}$s$^{-1}$); $^1$H NMR (CD$_3$CN) $\delta$ 8.14 (d, 1 H, J=13.7 Hz), 7.93 (s, 1 H), 7.58 (d, 1 H,J=13.7 Hz) 7.60 (s, 1 H), 7.01 (s, 1 H), 6.68 (s, 1 H), 3.91 (br t, H, J=5.5 Hz), 1.89 (br t, 4 H, J=5.5 Hz), 1.60 (s, 9 H), 1.52 (s, 9 H), 1.36 (s, 6 H), 1.32 (s, 6 H). Anal. Calcd for C$_{31}$H$_{44}$Br$_2$NTe.PF$_6$: C, 43.14: H, 5.14; N, 1.62. Found: C, 42.62; H, 5.04; N, 1.58.

The following illustrates the preparation of dyes from leuco dyes that can be used in the invention.

The following examples are presented for a further understanding of the invention:

Leuco dyes are well known intermediates in dye formation. Samples of the following leuco dyes here been prepared and converted into permanent dyes that are usable in accordance with this invention. These compounds are prepared by the following:
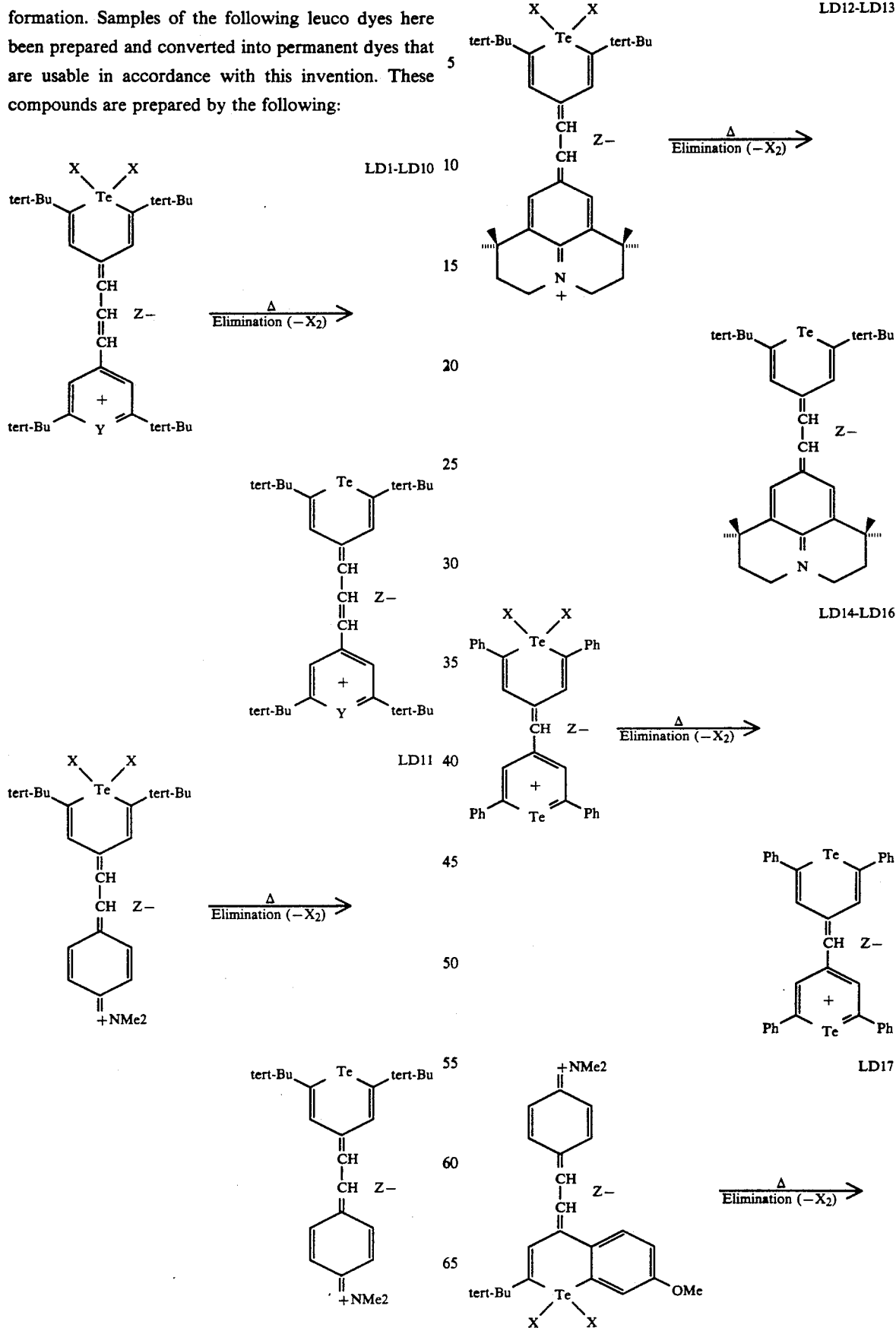

-continued

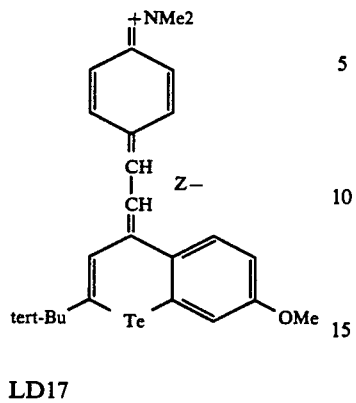

LD17

Structural details and spectral data for such leuco dyes and permanent dyes are compiled in Table II.

TABLE II

Tellurapyranyl Dihalide Leuco dyes Which Generate Near-Infrared-Absorbing Dyes Upon Heating

| Compound | R | X | Y | Z | Leuco dye $\lambda_{max}$ $(CH_2Cl_2)$, nm | Reduced Dye $\lambda_{max}$ $(CH_2Cl_2)$, nm |
|---|---|---|---|---|---|---|
| LD1 | H | Br | S | $PF_6$ | 535 | 750 |
| LD2 | H | Cl | Te | $PF_6$ | 548 | 833 |
| LD3 | H | Br | Se | Cl | 541 | 786 |
| LD4 | H | Cl | Se | Cl | 544 | 786 |
| LD5 | H | Br | Se | $PF_6$ | 544 | 786 |
| LD6 | H | Cl | Se | $PF_6$ | 532 | 786 |
| LD7 | H | Br | Te | $PF_6$ | 565 | 833 |
| LD8 | H | Br | Te | Cl | 565 | 833 |
| LD9 | $CH_3$ | Cl | Se | $ClO_4$ | 542 | 847 |
| LD10 | H | Cl | Te | Cl | 548 | 833 |
| LD11 | — | Cl | — | $PF_6$ | 530 | 713 |
| LD12 | — | Cl | — | $PF_6$ | 524 | 768 |
| LD13 | — | Br | — | $PF_6$ | 525 | 768 |
| LD14 | — | Br | — | $BF_4$ | 525 | 760 |
| LD15 | — | Cl | — | $BF_4$ | 497 | 760 |
| LD16 | — | I | — | $BF_4$ | 530 | 760 |
| LD17 | — | Cl | — | $PF_6$ | 544 | 753 |

A second class of leuco dye that can be used in accordance with this invention is a chalcogenapyran of the following structures:

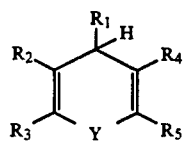

or

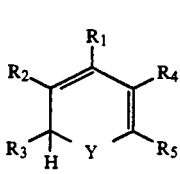

wherein:
Y is O, S, Se, or Te and $R_1$, $R_2$, $R_3$, $R_4$, and $R_5$ are as described above. Alternatively, the leuco dye may have the following structure:

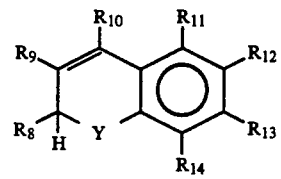

or

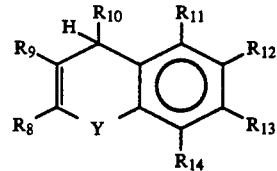

wherein:
Y is O, S, Se, or Te and $R_8$, $R_{10}$, $R_{11}$, $R_{12}$, $R_{13}$ and $R_{14}$ are as described above. Alternatively, the leuco dye may have the following structure:

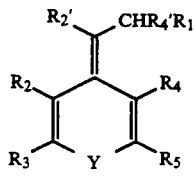

or

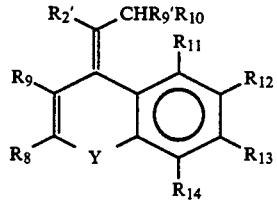

wherein:
Y is O, S, Se, or Te and $R_1$, $R_2$, $R_3$, $R_4$, $R_5$ $R_8$, $R_{10}$, $R_{11}$, $R_{12}$, $R_{13}$ and $R_{14}$ are described above and $R_{2'}$ is defined the same as $R_4$, and $R_{9'}$ is defined the same as $R_9$.

These leuco dyes are oxidized to infrared-absorbing dyes upon thermal or photochemical reaction of the write laser with a thermal acid generator or photoacid generator, respectively.

General Procedure for Leuco dye Synthesis

The chalcogenapyrylium dye was dissolved in ethanol (1 gram of dye in 50 to 250 mL of ethanol). Excess sodium borohydride (approximately 0.1 gram of sodium borohydride per gram of dye) was added. After the dye color had faded indicating complete consumption of dye, the reaction mixture was poured into water and the leuco dyes were extracted with dichloromethane. The combined dichloromethane extracts were dried over sodium sulfate and concentrated to give the leuco dyes LD19, LD20, LD22, and LD23.

Sodium borohydride reduction of chalcogenapyrylium dyes in ethanol gives excellent yields of neutral leuco dyes from hydride addition. As shown below, hydride addition occurs primarily at the central methine carbon to give symmetrical leuco dyes LD19. The minor products from these reactions gave hydride addition at the carbons bearing the tert-butyl groups. The overall chemical yield was 79% for the reduction of 18a, 85% for the reduction of 18b, and 91% for the reduction of 18c.

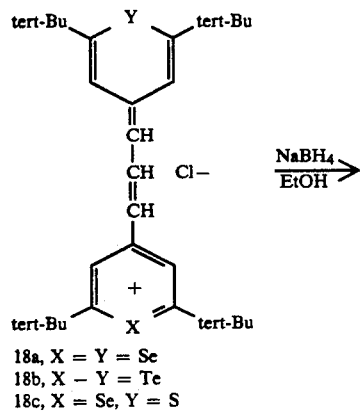

18a, X = Y = Se
18b, X = Y = Te
18c, X = Se, Y = S

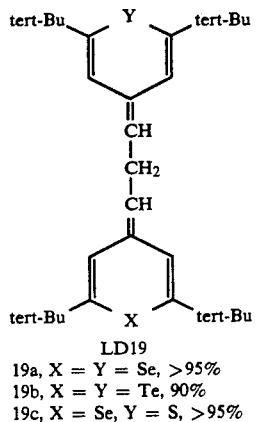

LD19
19a, X = Y = Se, >95%
19b, X = Y = Te, 90%
19c, X = Se, Y = S, >95%

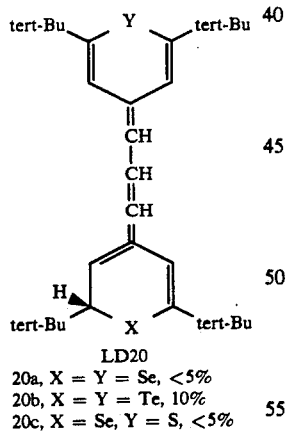

LD20
20a, X = Y = Se, <5%
20b, X = Y = Te, 10%
20c, X = Se, Y = S, <5%

The structural assignments of LD19 and LD20 followed form ¹H NMR spectra. The symmetrical products LD19 were characterized by a triplet for the central methylene and doublets for the two bridging methane signals. For LD19a and LD19b, two tert-butyl signals were apparent as were two olefinic signals for the pyranyl protons. Compound 19c was characterized by four tert-butyl signals, four olefinic singlets, and two sets of olefinic doublets. For compounds LD30, four tert-butyl signals were accompanied by a non-olefinic methine doublet, and three olefinic singlets. The filed desorption mass spectra of the mixtures were consistent with the addition of a hydride to the dye nucleus.

The regiochemistry of hydride addition was sensitive t the steric bulk of substituents. The dichloro trimethine dye 21 gave a much different product ratio upon hydride reduction. The symmetrical selenapyranyl compound LD22 was the minor component (30% of the mixture) while the unsymmetrical selanapyran LD23 was the major component (70% of the mixture). The chlorine groups are much larger than a proton leading to decreased hydride addition at the central methine carbon atom. The mixture of LD22 and LD23 was isolated in 86% yield.

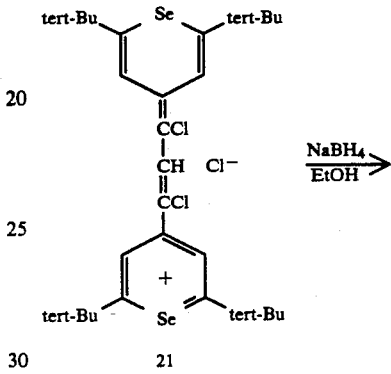

21

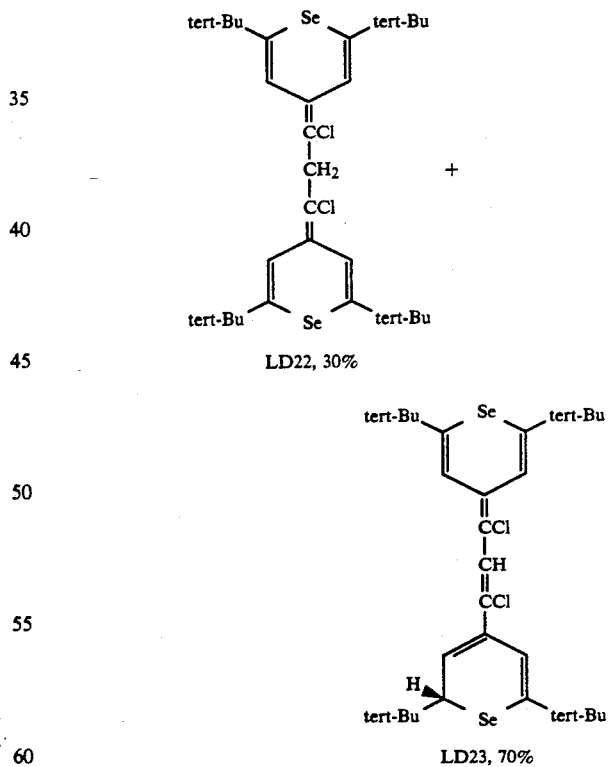

LD22, 30%

LD23, 70%

Preparation and Operation of CD Disc

Example I

A solution was prepared by mixing the following chemicals and filtering through a 0.2 micron filter to remove any insoluble residue.

| Sensitizing Component | Reference | Amount |
|---|---|---|
| Dye | I (See Below) | 7.5 mg |
| Leuco dye | LD1 | 60.0 mg |
| Binder | II (See Below) | 82.5 mg |
| Solvent | 1-Methoxy-2-propanol | 5.0 ml |

The following is an example of how to form a recordable element:

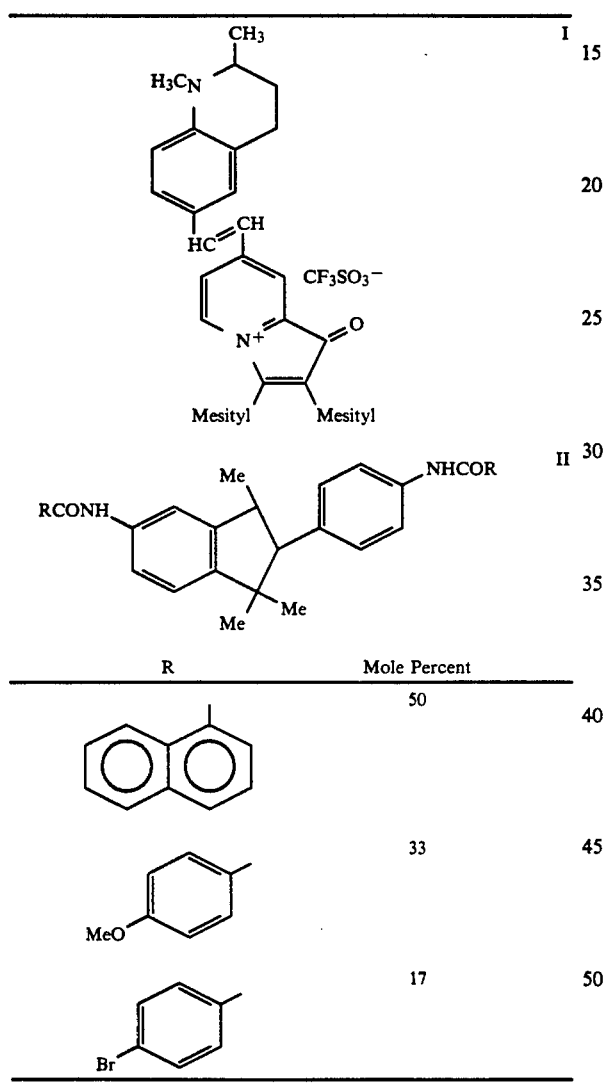

The recording layer was formed by spin coating the solution onto a 120 mm featureless polycarbonate substrate to a thickness of approximately 200 nm.

A gold reflector layer approximately 130 nm thick was applied to the recording layer by resistive heating vacuum evaporation.

The optical recording medium had a reflectivity of 61.4% when measured through the substrate with collimated light at 780 nm.

The disc was recorded on by a focused laser (788 nm) operating through the substrate, while spinning at 2.4 m/s, 2x the normal CD speed. Dark marks on a reflective background were formed as evidenced by their wave forms and by subsequent examination of the recording by brightfield microscopy at 780 nm.

A 4–16 mW power series of I11 marks was written on the disc. When read back with the write laser at reduced power (0.6 mW), the disc exhibited good recording contrast and sensitivity. A CNR of 61 dB was obtained at 10 mW write power.

A track of I11 marks (i.e. mark=space—3.56 um) was recorded at 10 mW and the optical contrast (I11/Itop) was found to be 0.73. A track of I3 marks (0.97 μm marks and spaces) gave an optical contrast of 0.28.

Example II

The procedure of Example I was repeated except that LD2 (Table II) was employed as the leuco dye. Dark marks on a reflective background were formed as evidenced by brightfield microscopy at 780 nm. The CNR of a track of I11 marks was found to be 48 dB at 16 mW while a control coating without leuco dye exhibited a CNR of only 34 dB.

Example III

The procedure of Example I was repeated except that LD4 (Table II) was employed as the leuco dye. Dark marks on a reflective background were formed as evidenced by brightfield microscopy at 780 nm. The CNR of a track of I11 marks was found to be 55 dB at 16 mW while a control coating without leuco dye exhibited a CNR of only 34 dB.

Example IV

The procedure of Example I was repeated except that LD6 (Table II) was employed as the leuco dye. Dark marks on a reflective background were formed as evidenced by brightfield microscopy at 780 nm. The CNR of a track of I11 marks was found to be 51 dB at 16 mW while a control coating without leuco dye exhibited a CNR of only 34 dB.

Example V

The thermal acid generator chosen for the following example was a compound which has the structure:

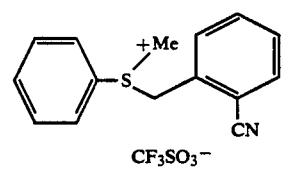

Generation of trifluoromethanesulfonic acid would be initiated via thermal formation of the orthocyanobenzyl radical and thioanisole cation radical.

Preparation of an Optical Disc

Two solutions were prepared by mixing the following chemicals and filtering through a 0.2 micron filter to remove any insoluble residue.

| Component | Solution 1 | Solution 2 |
|---|---|---|
| Sensitizing Dye I | 15 mg | 15 mg |
| Leuco dye LD-23 | None | 100 mg |
| Thermal Acid III | None | 100 mg |
| Binder III | 285 mg | 85 mg |
| 1-Methoxy-2-propanol | 10 cc | 10 cc |

Optical discs were prepared by spin coating the solutions onto 120 mm featureless polycarbonate substrates to a thickness of approximately 200 nm. A gold reflector layer approximately 130 nm thick was applied to the layers by resistive heating vacuum evaporation.

The discs were recorded on by a focused laser (788 nm) operating through the substrate, while spinning at 2.4 m/s. A power series of Ill marks was written on the discs.

The disc (#2) prepared from Solution 2 afforded a focused beam reflectivity of 58%. Writing caused the formation of dark marks on the reflective background as evidenced by the electronic wave forms and by microscopic observation (780 nm brightfield illumination). Ill/Itop increased to 0.30 through the 2-18 mW power series. The CNR signal peaked at 44 dB.

In the control disc (#1), prepared from the Solution 1, the focused beam reflectivity was 66%. Writing caused slight marking of the media as evidenced by distortion of the gold layer as seen by gold incident DIC microscopy. This was comparable to that observed in disc #1. However, there was no observation of dark marks on the reflective background when observed throughout the substrate under 780 brightfield illumination, nor was there any observation of a significant electronic wave form indicative of reduced reflectivity. Ill/Itop stayed at 0.04±0.01 throughout the 2-18 mW power series. CNR peaked at 34 dB.

The invention has been described in detail with particular reference to certain preferred embodiments thereof, but it will be understood that variations and modifications can be effected within the spirit and scope of the invention.

What is claimed is:

1. An optical retrival apparatus comprising:
   (a) an optical element having a substrate and on the surface of said substrate, a single dye containing recording layer having a mixture of a binder, sensitizing dye, and a tellurium (IV) leuco dye and which has information dye marks recorded therein and a light reflecting layer, said dye marks being formed by the leuco dye which, in selected areas, has been thermally reacted upon to become an absorption dye, the dye marks absorbing in the near-infrared portion of the spectrum;
   (b) illuminating means including a laser for producing a beam which illuminates said optical element and which is reflected from said reflecting layer so as to be modulated by said marks, said illuminating means includes a polarization beam splitter and a quarter wave plate which causes the radiation which illuminates the optical element to be circularly polarized and the reflected modulated beam to be linearly polarized; and
   (c) sensor means responsive to said reflected modulating radiation beam to produce electrical signals having an information content corresponding to the dye marks.

* * * * *